United States Patent [19]
Urmenyi

[11] 3,763,483
[45] Oct. 2, 1973

[54] METHOD OF AND DEVICE FOR DETECTING SURFACE ELEVATIONS IN SHEET MATERIAL

[76] Inventor: Laszlo Urmenyi, London, England

[22] Filed: Sept. 16, 1971

[21] Appl. No.: 176,348

[30] Foreign Application Priority Data
Sept. 28, 1970  Great Britain.................. 46,025/70
Mar. 4, 1971  Great Britain.................. 05,979/71

[52] U.S. Cl............ 340/259, 33/147 N, 333/148 H, 73/159; 200/61.13
[51] Int. Cl. ........................................... G08b 21/00
[58] Field of Search.................... 340/259; 33/148, 33/147 N, 148 H; 73/159; 200/61.13

[56] References Cited
UNITED STATES PATENTS
3,363,458  1/1968  Scharf et al.................. 340/259 X
3,502,827  3/1970  Beebe ........................... 340/259 X
3,553,668  1/1971  Urmenyi........................ 340/259

*Primary Examiner*—David L. Trafton

[57] ABSTRACT

A method of and device for detecting surface elevations, like lumps, wrinkles, creases, etc. in paper and other sheet material. The sheet material is made to pass over a supporting roll and feeler members are mounted in a movable manner at a small distance from the sheet material above the supporting roll. This distance is smaller than the surface elevations to be detected and electronic means are provided to give a signal when a surface elevation lifts the feeler member, thereby changing the distance between the feeler member and an independently pivoted reference member. Means are provided to keep the distance between the surface of the sheet material and the feeler members constant, independent of inaccuracies and eccentric running of the supporting roll by providing contact members which take bearing on the supporting roll either via the sheet material or on two smaller diameter end portions of the supporting roll. By tuning the mechanical oscillatory frequency of feeler members and reference members the device can be made insensitive to vibrations of the supporting roll.

1 Claim, 4 Drawing Figures

Patented Oct. 2, 1973 3,763,483

METHOD OF AND DEVICE FOR DETECTING SURFACE ELEVATIONS IN SHEET MATERIAL

Several devices have been proposed to detect surface elevations like lumps, creases, etc., in moving paper and other sheet material in which the paper is made to pass over a supporting roll and feeler members are mounted on a beam above the roll, the feeler members being positioned at a small distance above the surface of the paper adjacent to the area where the paper is in contact with the supporting surface, the said small distance being smaller than the smallest surface elevation to be detected and when a surface elevation is passing under a feeler member the feeler member is lifted up by it momentarily and electronic means are provided to give a fault signal every time one of the feeler members is thus lifted.

It will be appreciated that in order to obtain consistent and satisfactory operation the supporting roll must be made to the highest degree of accuracy. Such rolls are very expensive to make and a certain amount of inaccuracy always remains. More particularly it is impossible to achieve perfect concentric running. Due to eccentric running the distance between the feeler members and the surface of the sheet material changes periodically with every revolution of the roll. The cross section is not perfectly circular but is slightly oval and this contributes further to the periodic change in the distance between the feeler members and the surface of the sheet material.

According to the invention the device for detecting surface elevations in sheet material moving over a supporting roll which has a supporting surface of cylindrical shape adapted to support the sheet material to be inspected, comprising at least one feeler member which is adapted to be mounted in a movable manner at a distance which is smaller than the smallest surface elevation to be detected, which distance may be zero, from the surface of the sheet material, opposite the area in which the sheet material is in contact with the supporting surface, part of the surface of the feeler member being adapted to contact the surface elevations to be detected, a contact member mounted in a movable manner and adapted to take a bearing on the supporting roll, a reference member controlled by the contact member and electrical means adapted to provide an electrical signal when the feeler member is moved relative to the reference member by a surface elevation in the sheet material to be inspected.

In one example of the invention the contact member is placed adjacent to the feeler member adapted to contact the surface of the sheet material thus taking a bearing on the surface of the supporting roll via the sheet material.

In another example of the invention two contact members are adapted to contact the supporting roll outside the supporting surface at the two ends of the supporting roll, a datum beam being mounted on the two contact members essentially parallel to the supporting roll, thus the datum beam taking a direct bearing on two portions of the supporting roll and the reference members are controlled by the contact members via the datum beam.

The said two portions of the supporting roll are preferably of smaller diameter than the diameter of the supporting surface. The said two portions and the larger diameter supporting surface must be ground in the same operation. The cross section of the supporting surface is never a mathematically accurate circle but it is slightly oval. The cross section of the smaller diameter portions, if ground in the same operation, will then also be slightly oval, having the same main axis, but the two cross sections will be equidistant to a great degree of accuracy and this is the only essential requirement.

The invention will now be more fully explained by way of examples illustrated in the drawings in which.

Figure 1:
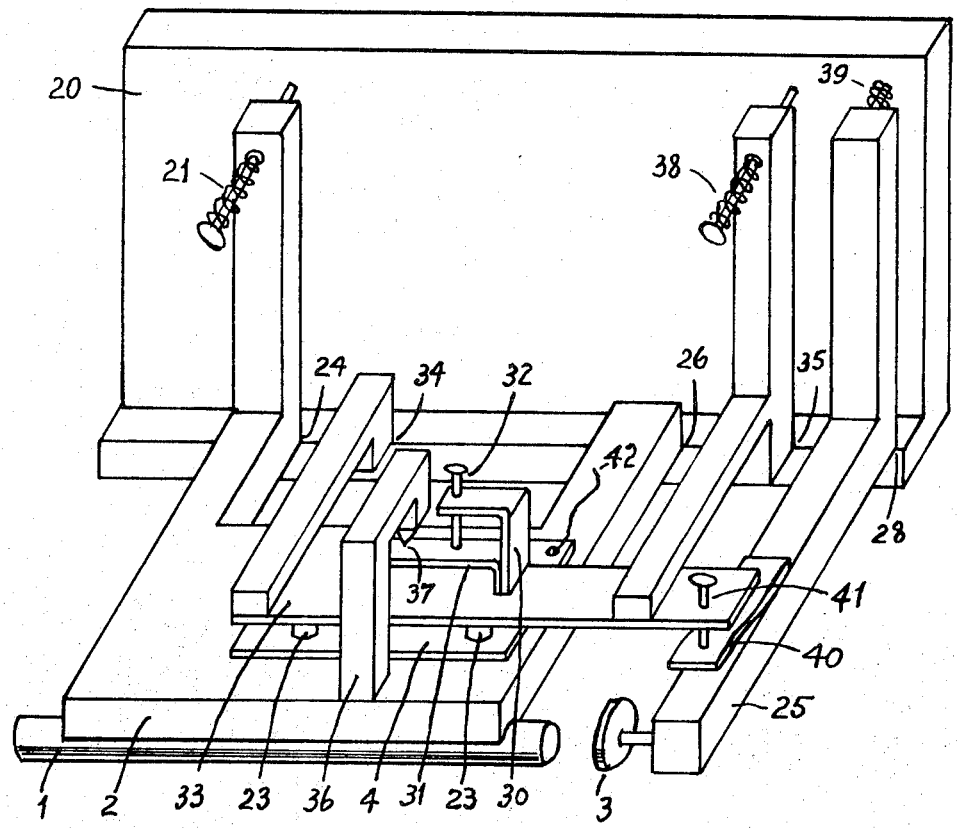
FIG. 1 shows an example of a probe design including the contact member.

In FIG. 1 of the drawing, 1 is a feeler member comprising also part 2 which is a capacitor plate and is pivoted at points 24 and 26 using cross strip hinges which for the sake of clarity of the drawing are not shown. Bracket 20, which carries the whole probe assembly, is adjustably mounted on a beam not shown. The weight of parts 1 and 2 is partially balanced by adjustable spring 21. 33 is a reference member pivoted at points 34 and 35. 4 is a capacitor plate mounted on part 33 by means of insulating members 23. 30 is a bracket carrying leaf spring 31 and adjusting screw 32. 36 is a bracket mounted on part 2 and is resting at point 37 on leaf spring 31. The weight of reference member 33 is partially balanced by adjustable spring 38. 3 is a contact member mounted on bracket 25 which is pivoted at 28 and is biased by spring 39 towards the supporting surface not shown. Part 25 carries a leaf spring 40 which acts as a shock absorber. Instead of a leaf spring, a rubber pad may be used, both being the simplest types of shock absorbers, but are in many cases sufficient to reduce sudden shocks as they are transmitted from member 3 to member 33. In some cases the use of a shock absorber may be omitted, in other cases any of the known types of more efficient shock absorbers may be used. Part 33 rests on part 25 via adjustable screw 41 and leaf spring 40. 42 is an electrical wire connection to insulated capacitor plate 4.

In operation, contact member 3 is made to contact the surface of the sheet material to be inspected as it passes over a supporting surface which in this case is a rotatable idler roll. By adjusting screw 32 the clear gap between capacitor plates 2 and 4 can be adjusted. Then by adjusting screw 41 plates 2 and 4 can be raised or lowered together, screw 41 being adjusted so that there is a small distance between feeler member 1 and the sheet material to be inspected, said small distance being smaller than the smallest surface elevation to be detected. When a surface elevation, which is greater than said distance, is passing under member 1, member 1 is lifted thereby reducing the distance between capacitor plates 2 and 4 producing thus an electrical signal.

In order to be able to detect limp creases, adjustable spring 21 must be adjusted so that the greater part of the weight of parts 1 – 2 is balanced so that a very small force is only required to lift these parts. If parts 1 and 2 are deflected and then left to themselves, they will carry out mechanical oscillations, the frequency of these oscillations depending on the adjustment of spring 21. If the supporting surface is subjected to vibrations, these vibrations are transferred to contact member 3 and via screw 41 to member 33. Normally this would cause changes in the gap between parts 2 and 4 and produce unwanted fault signals. Now if spring 38 is adjusted so that the natural mechanical oscillatory frequency of parts 4 and 33 is equal to the oscillatory frequency of parts 1 and 2, then every time part 33 is moved upwards via screw 41 due to the vibration of the supporting surface, part 2 is also moved upwards by part 33 via leaf spring 31 and contact point 37, and the two parts 2 and 33 move up and down together, keeping the gap between 2 and 4 unchanged and so no electrical signal is produced.

Theoretically of course it would be possible to mount the contact member directly on member 33 and the same effect would be achieved. However, it will be appreciated that if spring 21 is adjusted so that a very small force is required to lift parts 1 – 2, or in other words bracket 36 rests on leaf spring 31 with a very small force, then if spring 38 is adjusted so that the frequency of mechanical oscillations of part 33 is equal to the frequency of mechanical oscillations of part 2, the force by which part 33 rests via screw 41 on part 25 is also very small. If contact member 3 would be mounted on member 33, then the pressure of part 3 on the sheet material would be very light and part 3 would not rotate but would skid over the surface of the sheet material, thereby collecting dirt, and in case of coated paper collecting coating material. In order to ensure that part 3 is safely rotated by the moving sheet material, part 3 is mounted on a separate pivoted member 25 which is biased by spring 39 towards the sheet and the supporting surface to provide the necessary pressure. Alternatively, if member 25 has sufficient weight, the pressure can be provided by the weight of part 25 alone without the use of spring 39.

In practice the machanical oscillations of parts 2 and 33 is of very short duration and consists usually of one period of oscillation only, due to the contact between screw 41 and arm 25, via shock absorber 40 if one is used. Therefore the mechanical tuning of parts 2 and 33 is not critical and often good results can be achieved if part 33 is tuned to a higher frequency than part 2.

Usually more than one probe is used, since the length of member 1 can not be made long enough to inspect the whole width of the material to be inspected. The lengths in the radial direction of parts 2 and 25 may be alternately varied so that part 1 of one probe extends in front or behind part 3 of the neighbouring probe, thereby parts 1, essentially end to end, inspect the whole width of the material.

Figure 3:
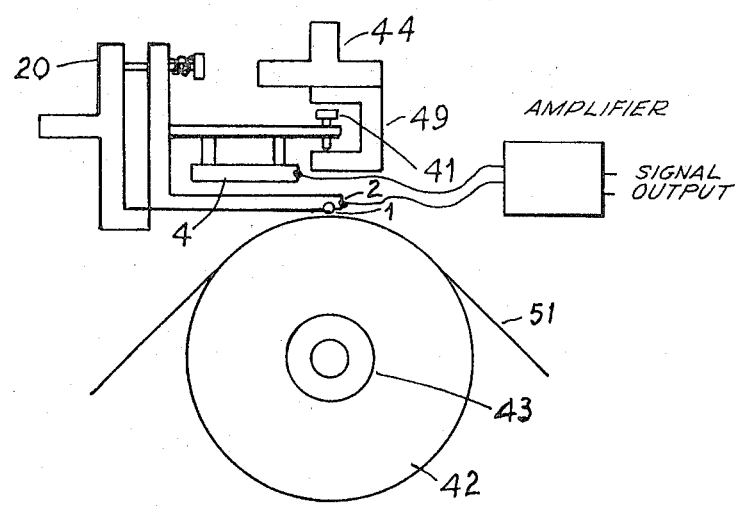
FIG. 3 shows diagramatically the relative positions of the carrier beam with probe, the datum beam and the supporting roll.

If it is required that the contact members should contact the supporting roll outside the supporting surface, then arm 25 is omitted and reference member 33 is resting via adjusting screw 41 on bracket 49 of the datum beam (see FIG. 3).

Figure 2:
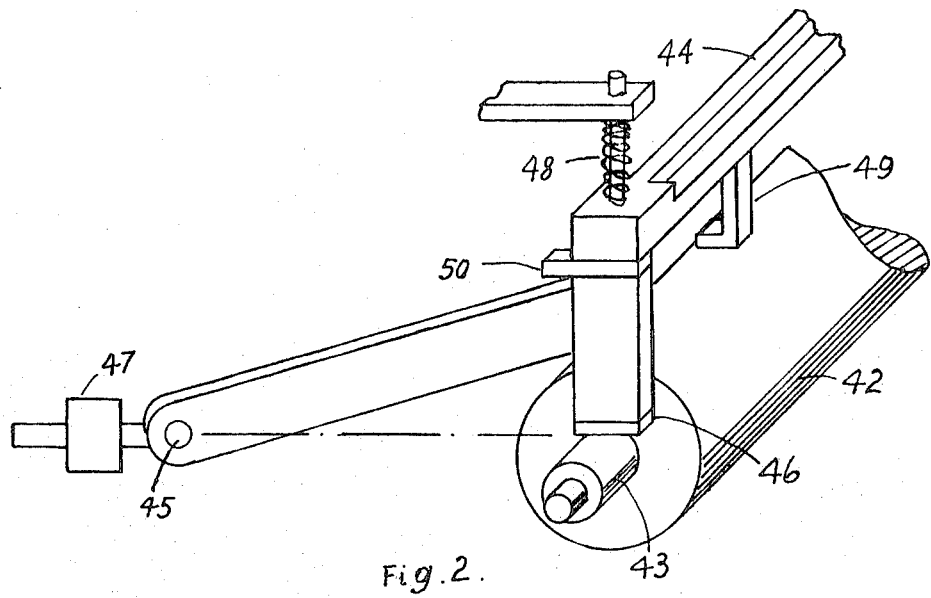
FIG. 2 shows diagrammatically an example of the mounting of the datum beam.

In FIG. 2, 42 is the supporting roll, 43 is one of the said two portions of the supporting roll, 44 is the datum beam pivoted at 45 and taking a direct bearing on portion 43 via pad 46, the said pad being made of a material of low coefficient of friction, e.g., porous bronze impregnated with PTFE, 47 is an adjustable balancing weight, 48 is a compression spring, which may be made adjustable if so required, 49 is a bracket, 50 is a removable gauge piece. Parts 43, 45 to 48 and 50 are duplicated at the other end of the supporting roll 42 and beam 44, not shown in the drawing. Pivoting points 45 are preferably in the plane tangential to 43 at the point of contact with 46.

In FIG. 3, 51 is the sheet material to be inspected. Identical parts are denoted with the same reference numerals as in the previous Figures. Adjusting screw 41 is resting on bracket 49. For the sake of clarity of the drawing brackets 30 and 36 have been omitted from this figure.

Figure 4:
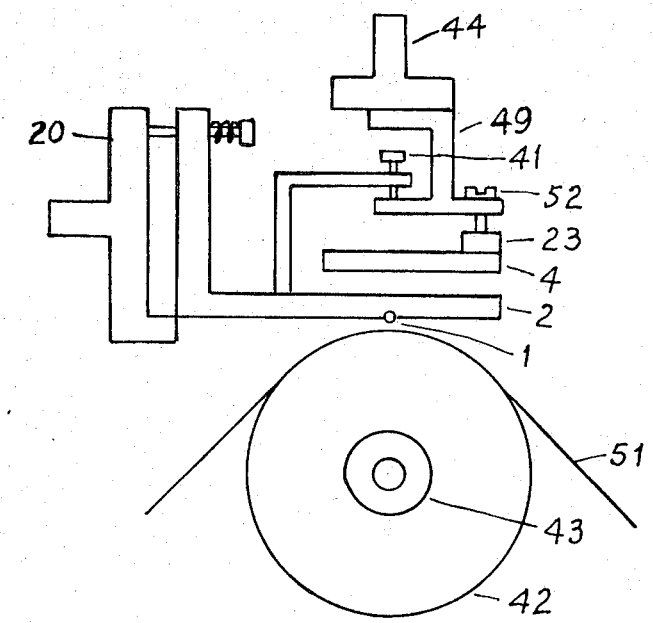
FIG. 4 shows an example of the invention in which a part of the electric means is mounted on the datum beam.

In FIG. 4, identical parts are again denoted with the same reference numerals as in the previous Figures. Here capacitor plate 4 is mounted on bracket 49. The distance between plates 2 and 4 is adjustable by means of adjusting screw 52. The distance between feeler member 1 and the surface of the sheet material may be adjusted by adjusting screw 41. If required, adjusting screw 41 may be omitted, and feeler member 1 allowed to contact the surface of the sheet material. In the latter case a rotating roller may be used as feeler member instead of a stationary rod.

By reasons of mechanical design the length of feeler member 1 is limited. If the width of the sheet material to be inspected is greater than the length of a single feeler member, then several probes may be mounted on the carrier beam next to each other so that the feeler members extend over the whole width of the sheet material. If more than one feeler member is employed, an equal number of brackets 49 must be provided or alternatively one long bracket may be used extending over the whole length of beam 44.

In operation gauge pieces 50 of suitable thickness must be inserted according to the thickness of the sheet material and the desired distance between the feeler members and the sheet material which distance may be zero. The balancing weight or weights 47 and/or spring 48 must be adjusted to obtain the smallest possible pressure between parts 43 and 46 compatible with the speed of the roll. The higher the speed of the roll, the greater must be this pressure to ensure that parts 43 and 46 do not lose contact. At low speeds springs 48 are omitted and at very high speeds balancing weights 47 are omitted and springs 48, which may be arranged to provide adjustable spring pressure, are applied.

At low speeds it is possible to arrange for the datum beam to rest via pad 46 on the supporting surface itself, but at high speeds this has several practical disadvantages. First of all it is inconvenient because should the sheet material accidentally run out sideways it could damage the precision contacting surface of pad 46. Then the braking torque of the datum beam on the roll is greater on the larger diameter, and the additional braking torque due to the inertia forces of the beam whilst it is accelerated upwards every half cycle of eccentric running is also greater. When the braking torque reaches a certain critical value, which depends on the angle of lap of the sheet material over the roll and the coefficient of friction between the sheet material and the roll, the sheet material is unable to rotate the roll and skids over the roll. In cases of certain types of sheet material, especially when the material is thin, the sheet material tears before the critical braking torque is reached. For all these reasons there is a great technical advantage to be gained by providing smaller diameter cylindrical portions 43 for supporting the datum beam and for thin or weak materials and/or at high speeds this is the only practical solution. At very low speeds however, satisfactory results may be obtained when the datum beam takes bearing on the supporting surface.

When a surface elevation is passing under feeler member 1, the feeler member is lifted up thereby reducing the distance between plates 2 and 4, increasing the electrical capacitance between them and thus initiating an electrical signal. It is clear that when due to eccentric running of roll 42 or its non-circular cross section datum beam 44 is lifted up, bracket 49 lifts up plate 4 by the same amount, which in turn lifts up plate 2 and feeler member 1 via leaf spring 31 and bracket 36 by an equal amount. Since due to the method of manufacture, as explained above, the surfaces of 43 and 42 are equidistant, i.e., the radial distance between 43 and 42 is constant round the circumference, the distance between feeler member 1 and the upper surface of the sheet material 51 remains constant and equally the distance between plates 2 and 4 remains unchanged.

Various modifications may be made to the above example without departing from the invention. For example parts 46 may be replaced by precision ball races. Alternatively ball races may be mounted on parts 43 and the datum beam adapted to rest on the stationary outer parts of the ball races. Instead of pivoting the datum beam at 45, it may be mounted for linear vertical movement using, e.g., linear ball bearings. The functions of the carrier beam and the datum beam may be united in one single beam at low speeds. However since the beam would carry the weight of the probes it would have to be of a more rigid and therefore heavier construction. The combined weight of the heavy beam and of the probes would be very much greater than the weight of a separate light weight datum beam, in consequence the pressure and therefore the frictional torque on the supporting roll would greatly increase which, at high speed, would become prohibitive. The probe design of FIG. 1 is only one of many possible designs and any probe design capable of giving an electrical signal may be adapted for use in conjunction with the invention. For example, the feeler member 1 in FIG. 2 may be a roller rotated by a small motor mounted on plate 2 and a brush or cleaning pad mounted nearby contacting the roller (or a jet of air directed at the roller) cleans it continuously in order to remove dust particles which may accummulate on it. Alternatively, the feeler member 1, being a roller, may be adapted to contact the sheet material and be rotated by it. In the latter case brackets 30 and 36 and parts 31, 32 and 37 would be omitted. Eccentric running and oval cross section of roll 42 would cause roll 1 to rise and fall periodically with every revolution of roll 42, but reference member 33 would also rise and fall due to similar rise and fall of beam 44 and in consequence the gap between capacitor plates 2 and 4 remain constant except when roll 1 is lifted by a surface elevation in the sheet material. In all examples capacitor plates 2 and 4 may be replaced by any other electrical means capable of giving an electrical signal when one part moves relative to the other, e.g., electromagnetic inductive means. Wheels 3 or pads 46 may be replaced by members suitably shaped to enclose an air cushion which could be sustained by the continuous supply of air under pressure. Thus direct mechanical contact with the sheet material or with parts 43 of the supporting roll would be avoided.

I claim:

1. Device for detecting surface elevations in sheet material moving over a supporting roll (42) which has a supporting surface of cylindrical shape comprising at least one feeler member adapted to be mounted in a movable manner opposite the area in which the sheet material is in contact with the supporting surface, at a distance, which is smaller than the smallest surface elevation to be detected, which distance may be zero, from the surface of the sheet material, the feeler member (1) being adapted to contact the surface elevations to be detected, at least one contact member (3) mounted in a movable manner adapted to take a bearing on the supporting roll, a reference member (33), the position of which relative to the surface of the sheet material is controlled by the contact member (3), adjustable means (41) being provided, controlled by the contact member (3), which prevents the distance between the reference member (33) and the surface of the sheet material becoming less than a pre-set value, and adjustable means (32) being provided which prevent the distance between the reference member (33) and the feeler member (1) becoming more than a pre-set value, and electrical means adapted to produce and electrical signal when the feeler member (1) is moved relative to the reference member (33) by a surface elevation in the sheet material.

* * * * *